US010461559B2

(12) United States Patent
Armstrong

(10) Patent No.: US 10,461,559 B2
(45) Date of Patent: Oct. 29, 2019

(54) CHARGING CONTROL FOR SUPERCAPACITOR(S)

(71) Applicant: THE PAPER BATTERY COMPANY, INC., Troy, NY (US)

(72) Inventor: Gene Lee Armstrong, Richardson, TX (US)

(73) Assignee: PRC TECH, LLC, Loudonville, NY (US)

( * ) Notice: Subject to any disclaimer, the term of this patent is extended or adjusted under 35 U.S.C. 154(b) by 376 days.

(21) Appl. No.: 15/241,441

(22) Filed: Aug. 19, 2016

(65) Prior Publication Data

US 2017/0063106 A1 Mar. 2, 2017

Related U.S. Application Data

(60) Provisional application No. 62/208,977, filed on Aug. 24, 2015.

(51) Int. Cl.
*H02J 7/00* (2006.01)
*H02J 7/34* (2006.01)

(52) U.S. Cl.
CPC ............ *H02J 7/007* (2013.01); *H02J 7/0077* (2013.01); *H02J 7/345* (2013.01)

(58) Field of Classification Search
CPC .......... H02J 7/007; H02J 7/0077; H02J 7/345; H02J 7/0016; Y02E 60/13; H01G 9/155; Y02T 10/7022
USPC ........................................................ 320/167
See application file for complete search history.

(56) References Cited

U.S. PATENT DOCUMENTS

| 5,498,951 | A | 3/1996 | Okamura et al. |
| 6,031,359 | A * | 2/2000 | Michelsen ............ H02J 7/0077 320/141 |
| 6,642,694 | B2 | 11/2003 | Yamanaka et al. |
| 6,992,464 | B2 | 1/2006 | Takano et al. |

(Continued)

OTHER PUBLICATIONS

Gene Lee Armstrong, International Search Report for PCT/US2016/047708, dated Oct. 31, 2016 (2 pages).

*Primary Examiner* — Edward Tso
*Assistant Examiner* — Mohammed J Sharief
(74) *Attorney, Agent, or Firm* — Kevin P. Radigan, Esq.; Heslin Rothenberg Farley & Mesiti P.C.

(57) ABSTRACT

Charge processes and systems are provided for charging a supercapacitor. The charging includes: charging a supercapacitor by applying a constant charge to the supercapacitor; and controlling termination of the constant charging of the supercapacitor. In one approach, the controlling termination includes dynamically determining, during the charging, a remaining charge time for the constant charging to substantially fully charge the supercapacitor; and allowing the charging to continue for the remaining charge time, and based on expiration of the remaining charge time, terminating the charging. In another approach, the controlling termination includes: dynamically determining, during the charging, an overcharge voltage value to be reached at the supercapacitor for the constant charging to substantially fully charge the supercapacitor; and allowing the charging to continue until the overcharge voltage value is reached at the supercapacitor, and based on reaching the overcharge voltage value at the supercapacitor, terminating the charging of the supercapacitor.

9 Claims, 10 Drawing Sheets

(56) References Cited

U.S. PATENT DOCUMENTS

| | | | |
|---|---|---|---|
| 7,808,211 B2 | 10/2010 | Pacholok et al. | |
| 2006/0269312 A1 | 11/2006 | Muraishi | |
| 2007/0030016 A1* | 2/2007 | Schumacher | B60R 21/0173 |
| | | | 324/678 |
| 2008/0185998 A1* | 8/2008 | Starodubtsev | H01G 9/155 |
| | | | 320/166 |
| 2010/0057268 A1 | 3/2010 | Smith et al. | |
| 2011/0031811 A1* | 2/2011 | Park | H02J 7/345 |
| | | | 307/66 |
| 2011/0057626 A1 | 3/2011 | Scrimshaw et al. | |
| 2011/0121793 A1* | 5/2011 | Liu | H01G 9/155 |
| | | | 320/167 |
| 2013/0119923 A1* | 5/2013 | Wright | H02J 7/0073 |
| | | | 320/107 |
| 2014/0253039 A1 | 9/2014 | Barsukov | |
| 2015/0084652 A1* | 3/2015 | Nagumo | G01R 27/2605 |
| | | | 324/686 |

* cited by examiner

CHARGING CONTROL FOR SUPERCAPACITOR(S)

CROSS-REFERENCE TO RELATED APPLICATION

This application claims the benefit of U.S. provisional patent application Ser. No. 62/208,977, filed Aug. 24, 2015, which is hereby incorporated herein by reference in its entirety.

BACKGROUND

A supercapacitor (SC), sometime referred to as an ultracapacitor, and formerly referred to as an electric double-layer capacitor (EDLC), is a high-capacity, electrochemical capacitor with capacitance values much higher than other capacitors, but lower voltage limits. A supercapacitor bridges the gap between electrolytic capacitors and rechargeable batteries. They typically store 10 to 100 times more energy per unit volume or mass than electrolytic capacitors, and accept and deliver charge much faster than batteries, and can tolerate more charge and discharge cycles than chargeable batteries.

Supercapacitors may be used in applications requiring rapid charge and discharge cycles, rather than long-term compact energy storage. Typically, supercapacitors use electrostatic double-layer capacitance or electrochemical pseudo-capacitance, or a combination of both. Supercapacitors are typically low-voltage components, which typically exhibit much longer lifetime than batteries. Supercapacitors generally have advantage in applications where a large amount of power is required for a relatively short time, or where a very high number of charge/discharge cycles is anticipated, or a longer lifetime is needed.

The ability to provide enhanced supercapacitor operation remains an area of interest and continued research for, for instance, establishing commercial advantage in the industry.

SUMMARY

The shortcomings of the prior art are overcome and additional advantages are provided through the provisional method which includes: charging a supercapacitor by applying a constant charge to the supercapacitor; and controlling termination of the constant charge charging of the supercapacitor, the controlling termination including: dynamically determining, during the charging, a remaining charge time for the charging to substantially fully charge the supercapacitor; and allowing the charging to continue for the remaining charge time, and based on the expiration of the remaining charge time, terminating the charging of the supercapacitor.

In another aspect, a method is provided which includes: charging a supercapacitor by applying a constant charge to the supercapacitor; and controlling termination of the constant charging of the supercapacitor, the controlling termination including: dynamically determining, during the charging, an overvoltage value to be reached at the supercapacitor for the constant charging to by the constant charge substantially fully charge the supercapacitor; and allowing the charging to continue until the overcharge voltage value is reached at the supercapacitor, and based on reaching the overcharge voltage value at the supercapacitor, terminating the charging of the supercapacitor.

In a further aspect, a system is provided for charging a supercapacitor. This system includes a power source to supply a constant charge to the supercapacitor, and a controller to control charging of the supercapacitor using the constant charge. The controller: dynamically determines, during the charging of the supercapacitor, one of a remaining charge time for the charging to substantially fully charge the supercapacitor, or an overcharge voltage value to be reached at the supercapacitor for the charging by the constant charge to substantially fully charge the supercapacitor; and allows the charging to continue until the determined remaining charge time is reached, or the determined overcharge voltage value is reached, and based thereon, terminates the charging of the supercapacitor.

Additional features and advantages are realized through the techniques of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Aspects of the present invention and certain features, advantages, and details thereof, are explained more fully below with reference to the non-limiting examples illustrated in the accompanying drawings. Descriptions of well-known materials, fabrication tools, processing techniques, etc., are omitted so as not to unnecessarily obscure the invention in detail. It should be understood, however, that the detailed description and the specific examples, while indicating aspects of the invention, are given by way of illustration only, and not by way of limitation. Various substitutions, modifications, additions, and/or arrangements, within the spirit and/or scope of the underlying inventive concepts will be apparent to those skilled in the art from this disclosure.

Figure 1:
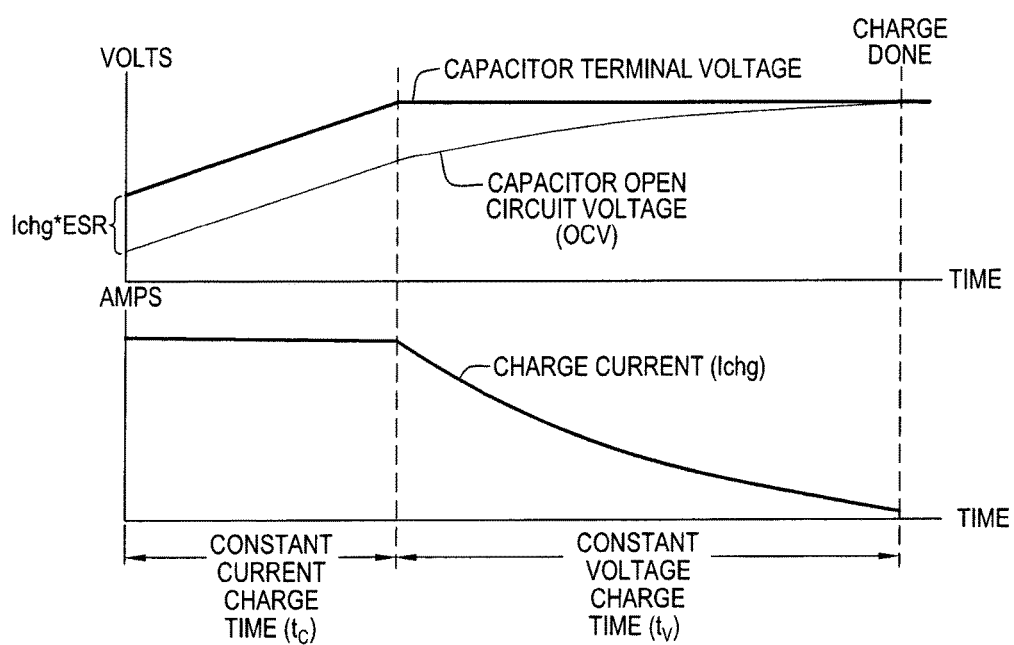
FIG. 1 graphically depicts one embodiment a conventional, partial constant current, partial constant voltage capacitor charge profile.

Traditionally, capacitors or supercapacitors, which are voltage constrained with regards to overcharge, have been charged using a ridged voltage limit technique, such as a constant current phase followed by a constant voltage phase. One embodiment of this is depicted in FIG. 1, where the constant current charge time ($t_c$) is shown to be less than the constant voltage charge time ($t_v$), with the constant current charge providing a majority of the energy charge to the supercapacitor (note that in the constant voltage phase, the capacitor terminal voltage is held at the prescribed voltage limit until the charge current (Ichg) falls below a fixed value). This typical charge approach yields a time inefficient delivery of energy to the capacitor with, for instance, the remaining 30% of charge capacity taking twice as much time to capture as expended in the initial constant current phase, which may provide (in one or more examples) about 70% of the charge capacity, as illustrated. As shown in FIG. 1, the capacitor open circuit voltage (OCV) at any time equals the capacitor terminal voltage under charge less the charge circuit (Ichg) times the internal resistance (ESR) of the supercapacitor.

Figure 2A:
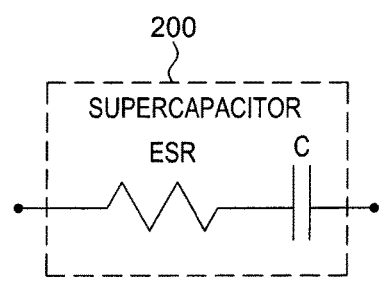
FIGS. 2A & 2B are schematic models of supercapacitors to undergo charge control, in accordance with one or more aspects of the present invention.
Figure 2B:
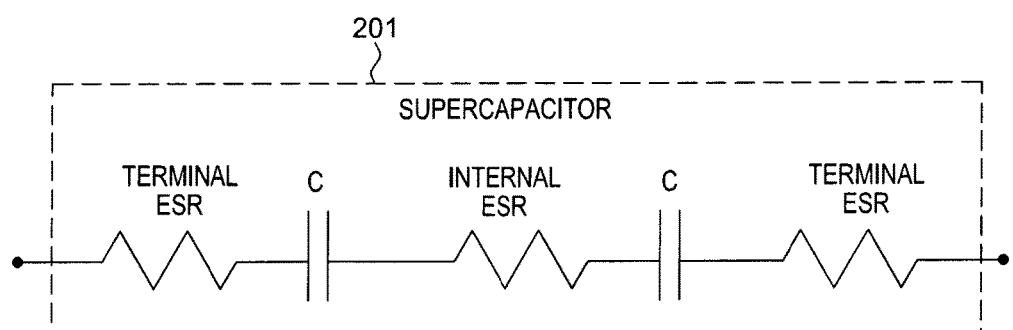

By way of example, FIG. 2A depicts an ideal model of a supercapacitor 200, which includes an ideal capacitor (C) in series with an ideal resistor (ESR), while FIG. 2B depicts a simplified model of a dual layer supercapacitor 201 with a terminal resistance (ESR) in series with an ideal capacitance (C) in series with an internal resistance (ESR) in series with an ideal capacitance (C) in series with another terminal resistance (ESR). This particular model is representative of the structure found in EDLC and asymmetric supercapacitor devices. With either model, the supercapacitor is limited in voltage operation due to electrolyte breakdown and active material decomposition. Both these factors lead to capacitor degradation if the capacitor (C) plate potential is not constrained to a prescribed voltage limit. As opposed to batteries, which are electrical current limited, supercapacitors are typically power limited in their exchange of energy, which advantageously allows greater degrees of freedom in the charging approach.

During charging, the voltage that is observable on the terminals of a supercapacitor includes, for instance in the case of the model of FIG. 2A, the voltage on the ideal capacitor (C) plus the voltage resulting from the charge current (Ichg) drop across the internal series resistance (ESR). The overcharge voltage constraint for the supercapacitor pertains exclusively to the voltage seen across the ideal capacitor (C), and therefore the ESR times Ichg voltage drop has the effect of unnecessarily slowing the rate of current flow into the supercapacitor during, for instance, the constant voltage phase charge, assuming a constant current phase, constant voltage phase charging as depicted in FIG. 1. To address the limitations of constant voltage charging, a predictive process is disclosed herein, using, for instance, modeled capacitance (C) or modeled internal resistance (ESR) supercapacitor parameters, which allows for an acceptable degree of overvoltage with regards to the supercapacitor device terminals, while constraining the ideal capacitor (C) to a full charge voltage value.

Figure 3:
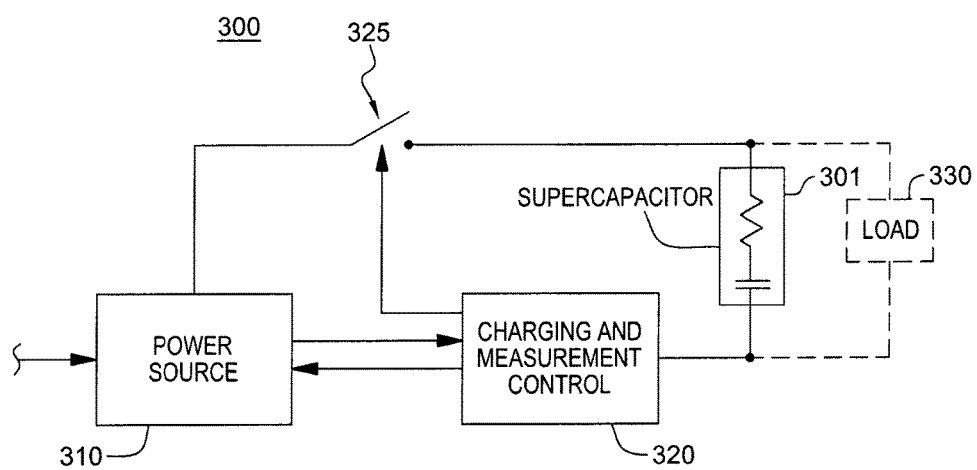
FIG. 3 is a schematic of one embodiment of a supercapacitor charge system, in accordance with one or more aspects of the present invention.

FIG. 3 depicts one example of a system, generally 300, in accordance with one or more aspects of the present invention. As illustrated, system 300 includes one or more supercapacitors 301, which supply power to a load 330. Supercapacitor(s) 301 is charged by a power source 310 and a charging and measurement control 320, which controls charging, in part, via a switch 325. In operation, power source 310 may be fixed or configurable to deliver energy in the form of a constant electrical current (Ichg) or power (Pchg) to supercapacitor 301. Charging and measurement control 320 monitors supercapacitor terminal voltage and, optionally, configures energy delivery parameters for power source 310. Additionally, controller 320 controls charge power through switch 325, and measures the open terminal voltage (OCV), and optionally the charge current (Ichg), as explained herein. Various embodiments of control processes, in accordance with one or more aspects of the present invention, are described further below with reference to FIGS. 6A-7B.

Figure 4:
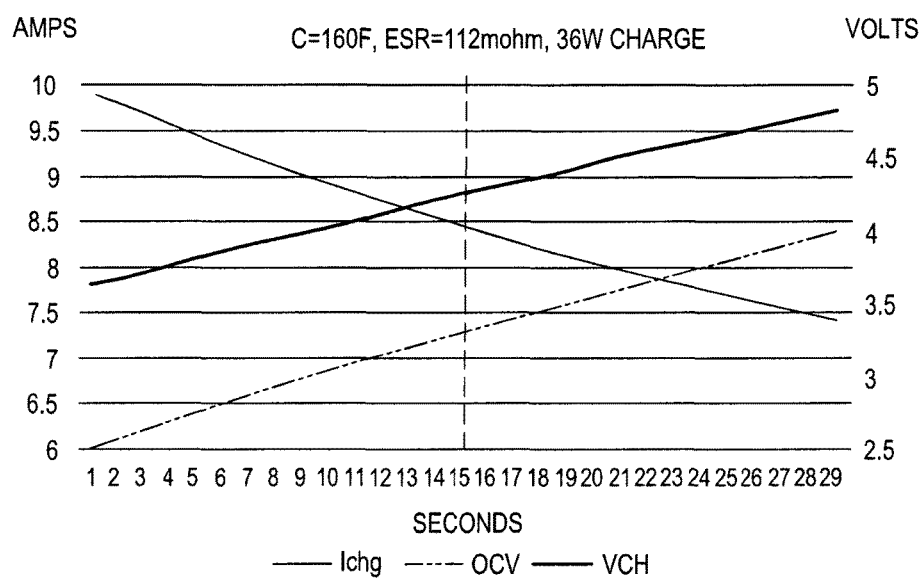
FIG. 4 depicts one embodiment of a supercapacitor charge profile under charge control, in accordance with one or more aspects of the present invention.
Figure 5:
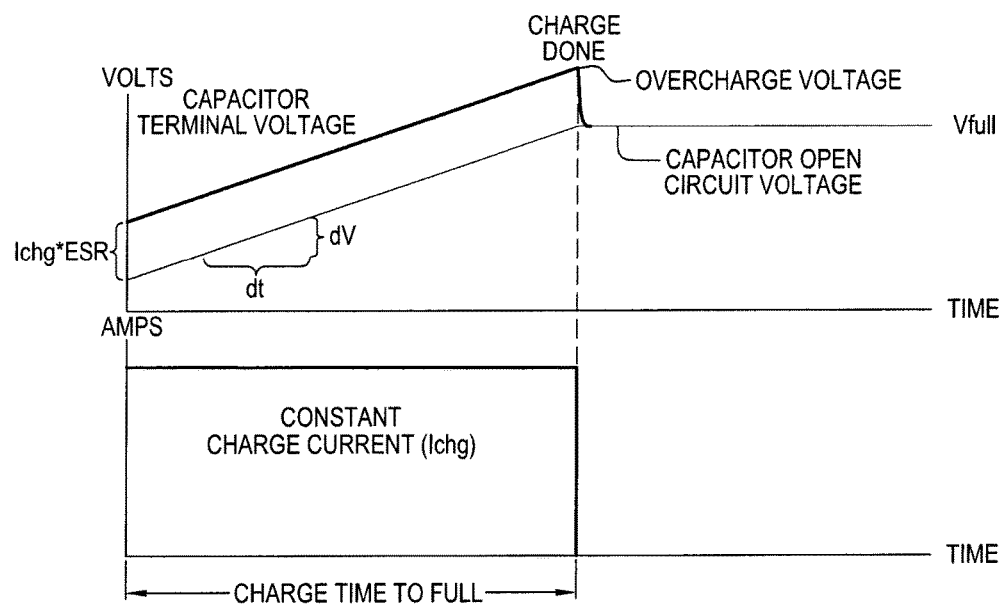
FIG. 5 graphically depicts one embodiment of supercapacitor charging under charge control, in accordance with one or more aspects of the present invention.

Multiple approaches to predicting completion of supercapacitor charging are described herein. Each of these approaches assume a constant charging of the supercapacitor. For instance, FIG. 4 illustrates one embodiment of a charge profile utilizing a constant power charging of a supercapacitor, while FIG. 5 illustrates a charge profile using a constant current charging of a supercapacitor, in accordance with one or more aspects of the present invention. These graphs assist in understanding the charging and measurement control processes described herein, such as below with reference to FIGS. 6A-7B.

Figure 6A:
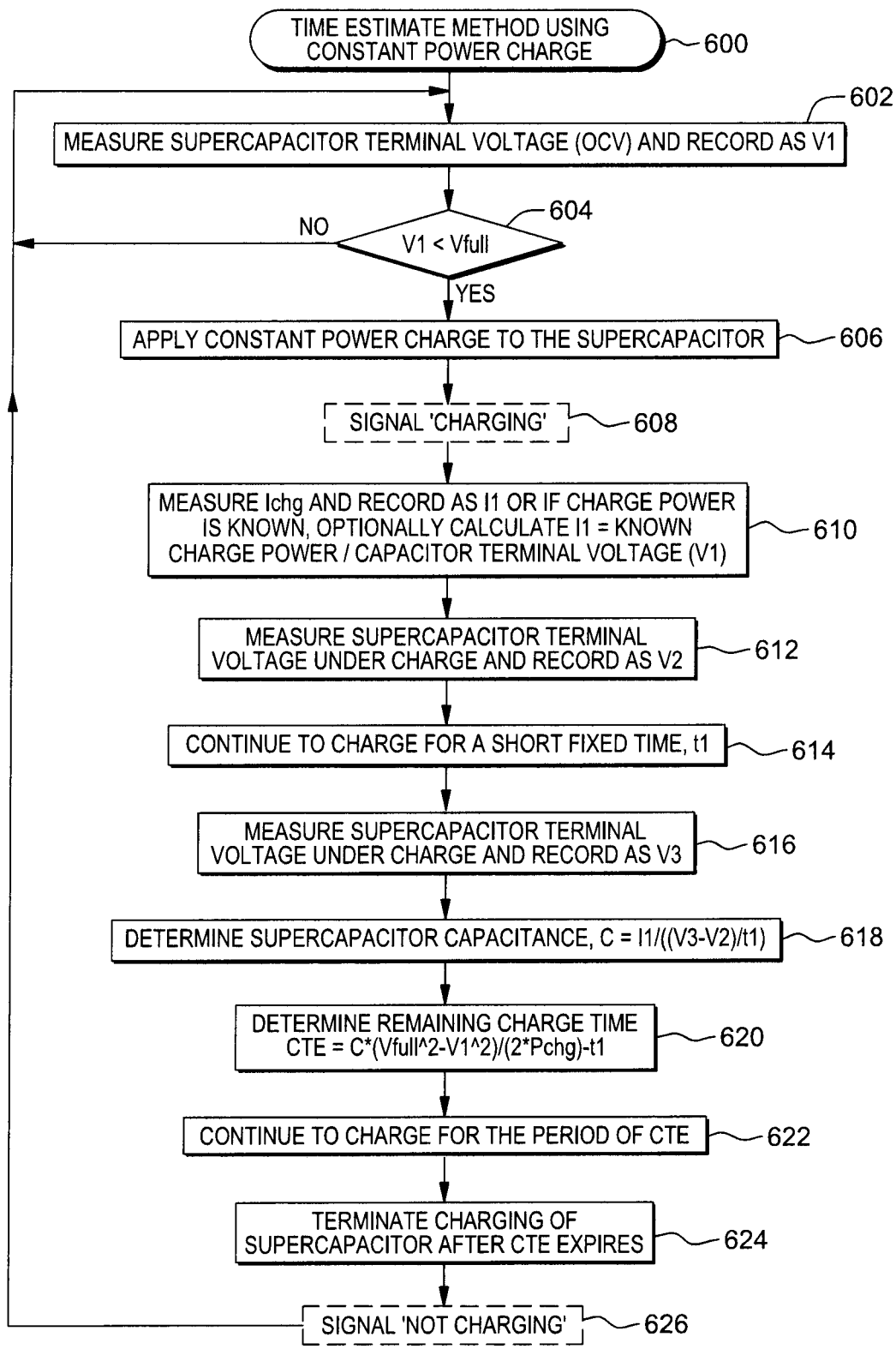
FIG. 6A depicts one embodiment of a charge control process, utilizing constant power charging of the supercapacitor, in accordance with one or more aspects of the present invention.
Figure 6B:
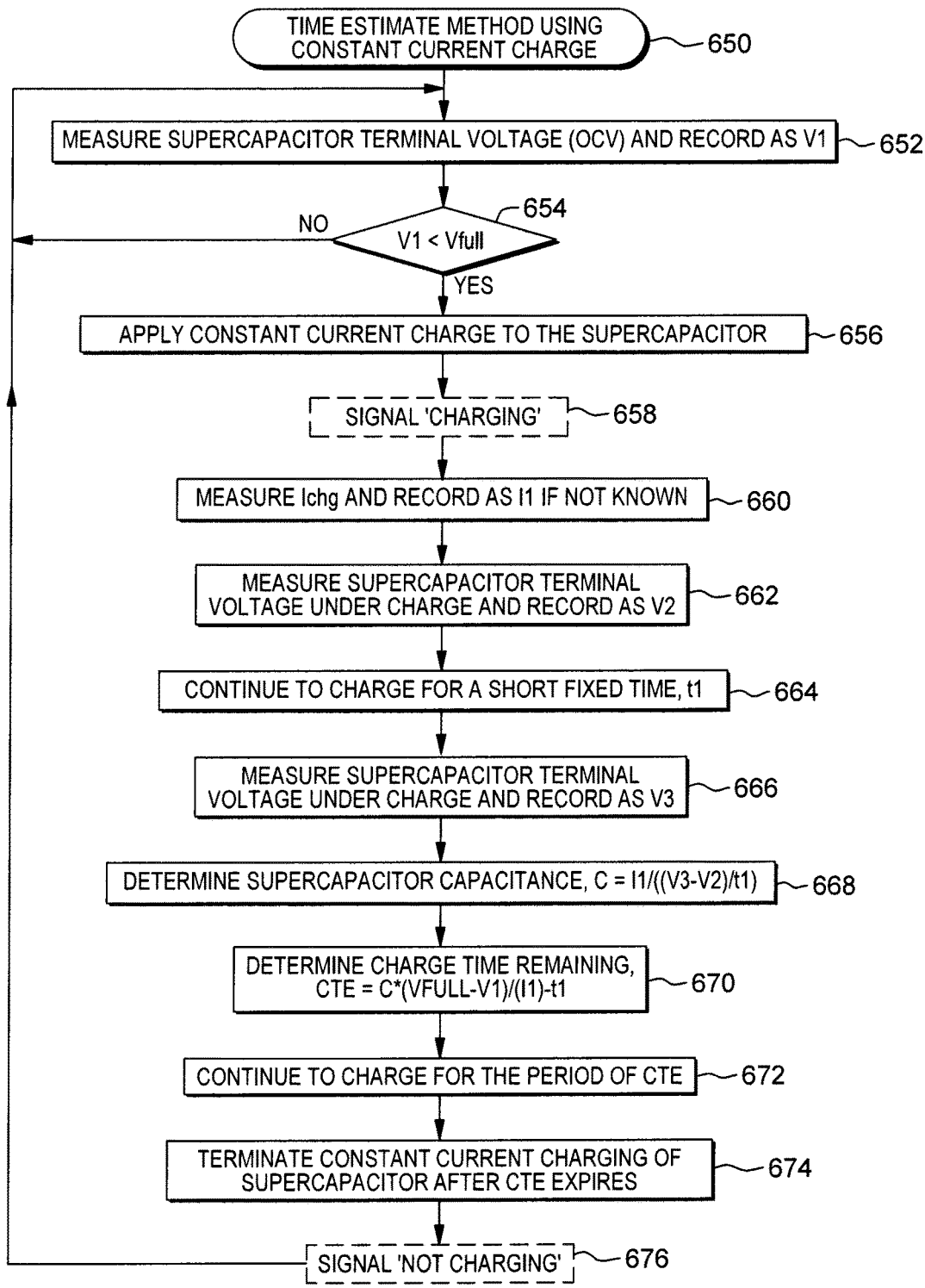
FIG. 6B depicts another embodiment of a charge control process, using constant current charging of the supercapacitor, in accordance with one or more aspects of the present invention.
Figure 7A:
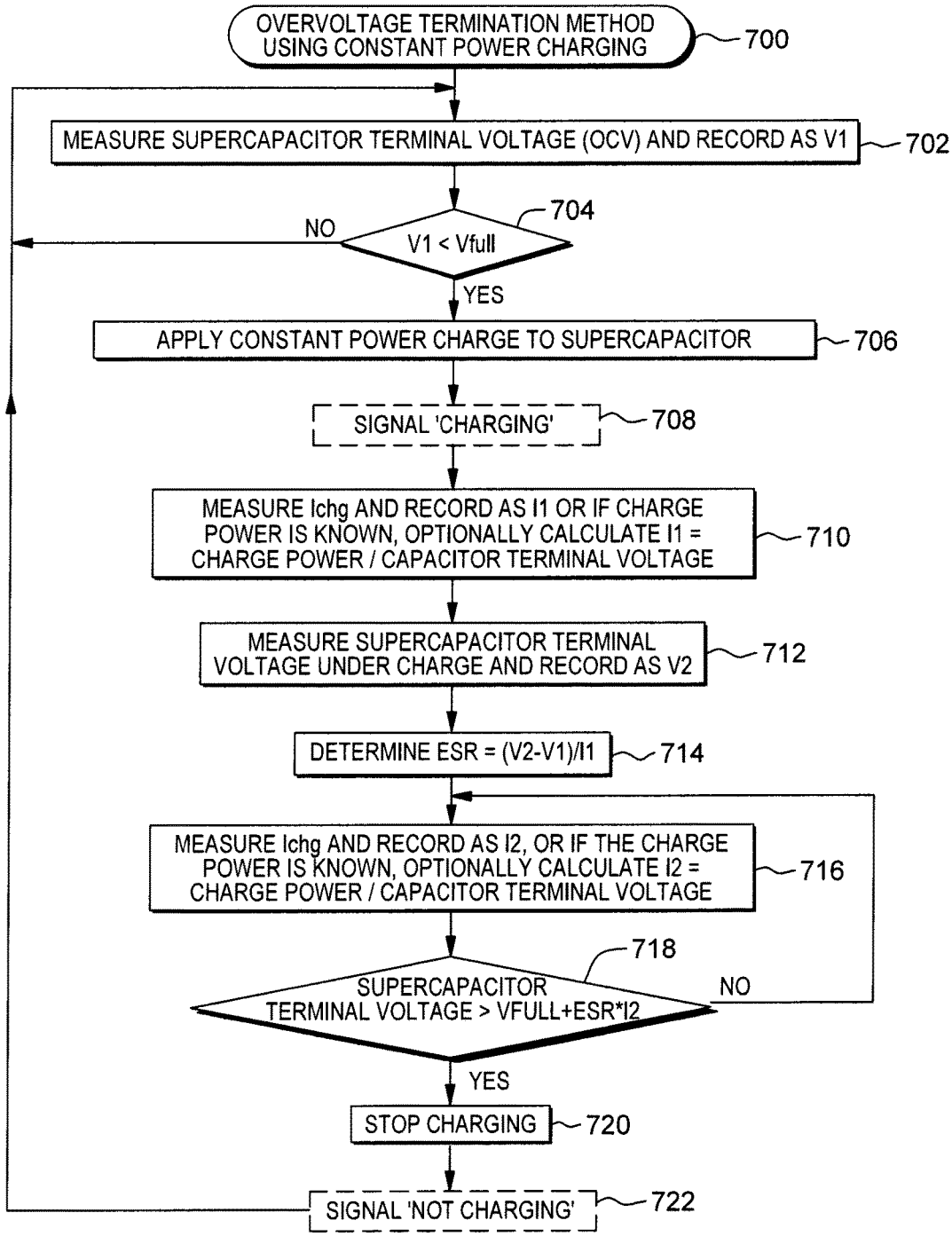
FIG. 7A depicts a further embodiment of a charge control process, using constant power charging of the supercapacitor, in accordance with one or more aspects of the present invention.
Figure 7B:
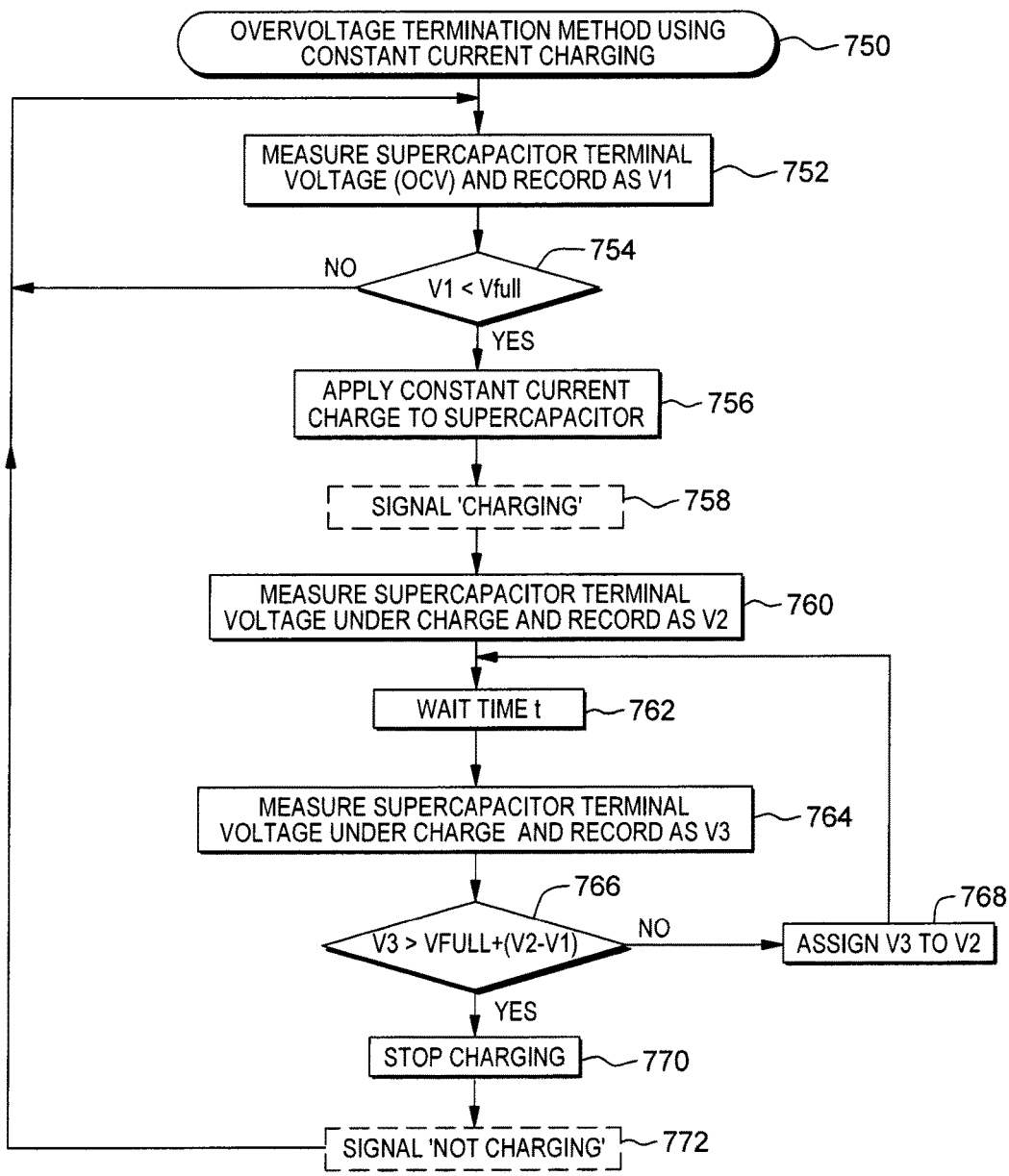
FIG. 7B depicts another embodiment of a charge control process, using constant current charging of the supercapacitor, in accordance with one or more aspects of the present invention.

More particularly, described herein are time estimation and overvoltage charge estimation approaches to completing constant charge charging of a supercapacitor. FIG. 6A depicts one embodiment of a process for time estimated termination of charging using a constant power charge, such as depicted in FIG. 4, and FIG. 6B depicts a time estimated method for terminating supercapacitor charging using a constant current charge approach, such is depicted in FIG. 5. Additionally, FIG. 7A depicts an overvoltage estimated, charge termination approach for a constant power charging application, and FIG. 7B depicts a process for overvoltage estimated, charge termination in a constant current charging application, in accordance with one or more aspects of the present invention.

Referring first to FIG. 6A, a time-estimated charge termination process 600 is illustrated which estimates remaining charge time to achieve full charge of a supercapacitor in a constant power charging application, in accordance with one or more aspects of the present invention. In this implementation, a current supercapacitor terminal voltage (OCV) is measured and recorded as voltage V1 602. This OCV voltage is an open circuit voltage, that is, a voltage across the supercapacitor without the supercapacitor currently undergoing charging (for instance, prior to closing switch 325 in FIG. 3). Processing determines whether voltage V1 is less than a supercapacitor full voltage Vfull 604. If "no", meaning that the supercapacitor is fully charged, then processing may wait a period of time before repeating the measurement of the supercapacitor terminal voltage (V1) 602. Assuming that the measured supercapacitor terminal voltage (V1) is below a full voltage value (Vfull), then a constant power charge (in this example) is applied to the supercapacitor 606 using, for instance, a charging system such as depicted in FIG. 3. As noted, FIG. 4 illustrates one embodiment of a constant power charging profile for a supercapacitor. As illustrated, the supercapacitor voltage in FIG. 4 during charging (VCH) increases as the charging current (Ichg)

decreases in the constant power charge scenario. Once beginning charging, the process may optionally signal one or more other modules, devices, systems, etc., that the supercapacitor is currently being charged 608.

Next, processing determines supercapacitor capacitance (C) during the charging operation. This may be determined by, for instance, measuring the charging current (Ichg) and recording the measured value as I1, or if the charge power is known, optionally calculating I1 as equal to the known charge power divided by the capacitor terminal voltage (V1) 610. The supercapacitor terminal voltage under charge may then be measured and recorded as voltage V2 612. In one or more embodiments, voltage V2 may be measured immediately following initiation of charging of the supercapacitor, for instance, immediately following closing of switch 325 in the system example of FIG. 3. The supercapacitor continues to charge for a short, fixed time interval t1 614 (in order to provide a difference in time), and the supercapacitor terminal voltage under charge is again measured and recorded as voltage V3 616. In one or more implementations, the value of t1 may be estimated as a period of time which will provide a measurable change in the supercapacitor's energy storage during the charging given, for instance, the supercapacitor's rate of capacitance, and rate of energy delivery of the power system over that time period. Processing then determines the supercapacitor capacitance (C) as, for instance, $C=I1/((V3-V2)/t1)$ 618. Once supercapacitor capacitance under charge is known, then a remaining charge time CTE to full may be determined 620, for instance, as $CTE=C*(Vfull^2-V1^2)/(2*Pchg)-t1$ 620. Charging continues for the remaining charge time (CTE) 622, and upon expiration of the remaining charge time, charging is terminated 624. Upon termination of charging, processing may signal "not charging" 626 if one or more entities were signaled that the supercapacitor was undergoing charging 608. Note that the process is inherently iterative in that processing next returns to measure the supercapacitor open circuit terminal voltage (OCV), record that voltage as a new V1 602, and determine whether the new V1 is now equal to the fully charged supercapacitor voltage (Vfull). If the new open terminal voltage (V1) is below the fully charged value (Vfull), then the process repeats until the two are equal.

As noted, FIG. 6B depicts a time estimated process for terminating supercapacitor charging where the supercapacitor is undergoing a constant current charge 650. In this implementation, supercapacitor terminal voltage (OCV) is measured and recorded as V1 652. As noted, the OCV voltage is an open circuit voltage, that is, a voltage across the supercapacitor without the supercapacitor currently undergoing charging (for instance, prior to closing switch 325 in FIG. 3). Processing determines whether voltage V1 is less than a supercapacitor full voltage (Vfull) 654. Note in this regard that Vfull assumes an internal resistance value of 0. If the supercapacitor is fully charged, then processing may wait a period of time before again measuring the supercapacitor terminal voltage 652. Assuming that the measured supercapacitor terminal voltage (V1) is below the full voltage value (Vfull), then a constant current charge (in this example) is applied to the supercapacitor 656 using, for instance, a charging system such as depicted in FIG. 3. As noted, FIG. 5 illustrates one embodiment of a constant current charging profile for a supercapacitor. As illustrated, the charging current Ichg is constant during charging, with the capacitor terminal voltage increasing with time until the estimated charge time has been reached. Once beginning charging, the controller may optionally signal one or more other modules, devices, systems, etc., that the supercapacitor is currently being charged 658.

Next, processing measures the constant current charge value (Ichg) and records it as I1 if not already known 660. The supercapacitor terminal voltage under charge is then measured and recorded as voltage V2 662, and the supercapacitor continues to be charged for a short, fixed time interval t1 664 (in order to provide a difference of time), after which the supercapacitor terminal voltage under charge is again measured, and recorded as voltage V3 666. Processing then determines the supercapacitor capacitance (C) as, for instance, $C=I1/((V3-V2)/t1)$ 668. Once the supercapacitor capacitance under charge is known, then a remaining charge time CTE to full may be determined, for instance, as $CTE=C*(Vfull-V1)/(I1)-t1$ 670. Charging continues for the remaining charge time (CTE) 672, and upon expiration of the remaining charge time, charging is terminated 674. Upon termination of charging, the controller may signal "not charging" 676 if one or more entities were signaled that the supercapacitor was undergoing charging 658. Note that this method is inherently iterative in that processing next returns to measure the supercapacitor open circuit terminal voltage (OCV), and record that voltage as a new V1 652, before determining whether the new V1 is now equal to a fully charged voltage value (Vfull). If the new open terminal voltage (V1) is below the fully charge value (Vfull), then the charge process repeats until the two are equal.

As noted, FIGS. 7A and 7B depict an alternate approach to controlling charging of a supercapacitor, in accordance with one or more aspects of the present invention. In these implementations, overvoltage estimation is employed rather than time estimation in determining when the supercapacitor reaches a fully charged state.

Referring to FIG. 7A, an overvoltage-based charge termination control process is provided for a constant power charging of a supercapacitor 700. In this implementation, the current supercapacitor terminal voltage (OCV) is measured and recorded as voltage V1 702. This OCV voltage is again the open circuit voltage, that is, the voltage across the supercapacitor without the supercapacitor currently undergoing charging. Processing determines whether voltage V1 is less than a supercapacitor full voltage value (Vfull) 704. If "no", meaning that the supercapacitor is fully charged, then processing may wait a period of time before repeating measuring of the supercapacitor terminal voltage (V1) 702. Assuming that the measured supercapacitor terminal voltage (OCV) is below the full voltage value (Vfull), then a constant power charge (in this example) is applied to supercapacitor 706 using, for instance, a charging system such as depicted in FIG. 3. Once charging begins, the process may optionally signal one or more other modules, devices, systems, etc., that the supercapacitor is currently undergoing charging 708.

Next, processing measures the charging current (Ichg) and records the measured charging current as I1, or if charge power is known, optionally determines I1 equal to charge power divided by capacitor terminal voltage (V1) 710. The supercapacitor terminal voltage under charge may then be measured and recorded as V2 712. With this information, the internal resistance (ESR) of the supercapacitor under charge may be determined, for instance as $ESR=(V2-V1)/I1$ 714. Processing then measures the charging current again and records this value as I2, or if the charge power is known, optionally determines I2 equal to the charge power divided by the current capacitor terminal voltage (V2) 716. Processing then determines whether the supercapacitor terminal voltage is greater than Vfull plus ESR times charge current (I2) 718. If "no", then processing waits a period of time before repeating the measuring or determining of the new charge current (I2) 716. Once the supercapacitor terminal voltage is greater than Vfull plus ESR times I2, that is, the capacitor terminal voltage (while charging) has reached the desired overcharge value (see FIG. 5), then charging is terminated 720. Upon termination of charging, processing may signal "not charging" 722 if one or more entities were signaled that the supercapacitor was undergoing charging 708. This process is again inherently iterative in that processing next returns to measure the current supercapacitor open circuit terminal voltage (OCV), and record that voltage as a new V1 702, before determining whether the new V1 is equal to the fully charged supercapacitor voltage (Vfull). If not, then the process repeats.

In FIG. 7B, a process 750 for overvoltage based termination of charging in a constant current charging application is provided. In this implementation, the supercapacitor terminal voltage (OCV) is measured and recorded as voltage V1 752, and processing determines whether voltage V1 is less than a supercapacitor full voltage (Vfull) 754. If "no", meaning that the supercapacitor is fully charged, then processing may wait a period of time before repeating measuring of the supercapacitor terminal voltage (V1) 752. Assuming that the measured supercapacitor terminal voltage (V1) is below the full voltage value (Vfull), then a constant current charge (in this example) is applied to the supercapacitor 756 using, for instance, a charging system such as depicted in FIG. 3. Once charging begins, the process may optionally signal one or more other entities, modules, devices, systems, etc., that the supercapacitor is currently being charged 758.

Next, processing measures a supercapacitor terminal voltage under charge and records this value as V2 760. Processing waits a time interval t 762, before again measuring the supercapacitor terminal voltage under charge and recording this voltage value as V3 764. Note that time t may be a minimal amount of time required to obtain a meaningful difference in measured capacitance voltages. Processing then determines whether the most recent supercapacitor terminal voltage under charge V3 is greater than the full voltage value (Vfull) plus the difference in voltage V2 minus V1 766. If "no", then the current supercapacitor terminal voltage under charge V3 is reassigned as V2, and processing returns to wait time t 762 before again measuring the supercapacitor terminal voltage. Once the supercapacitor terminal voltage under charge V3 equals or is greater than Vfull plus V2 minus V1, then processing stops charging 770. Upon termination of charging, processing may signal "not charging" 772 if one or more entities were signaled that the supercapacitor was undergoing charging 758. Note in the above discussion that voltage V2 is obtained immediately following initiation of charging of the supercapacitor in order to obtain the voltage difference across the internal resistance of the supercapacitor. Note also that the process is again inherently iterative in that processing next returns to measure the supercapacitor open circuit terminal voltage (OCV), and record that voltage as a new V1 752, and determine whether the new V1 is equal to the fully charged supercapacitor voltage (Vfull). If not, then the process repeats.

In the description above, any charge source (constant power, constant current, resistor limited voltage source, pulsed charge) may be employed to constantly charge the supercapacitor. The conventional prohibition against charging beyond a prescribed terminal voltage limit, previously identified as Vfull, ignores the fact that a substantial component of this voltage under charge is due to the internal resistance of the supercapacitor. As depicted in FIG. 5, the ESR component of the terminal voltage under charge results in the difference between the open circuit voltage and the capacitor terminal voltage under charge.

Advantageously, the systems and methods disclosed herein compensate for internal series resistance of the supercapacitor device. Termination control of the constant charge process may be time based or overvoltage based, as explained above. Note in this regard that overvoltage is employed by charging a supercapacitor to the overvoltage limit plus the charge current multiplied by the internal series resistance. Similarly, on the low voltage side of supercapacitor operation, discharge may proceed until the discharge voltage drops to a low voltage limit minus the discharge current multiplied by the internal series resistance.

In one or more implementations, knowledge of the current applied to charge a supercapacitor is not necessary to compensate for the internal series resistance, provided the charge process can be interrupted and the supercapacitor voltage measured. In such an embodiment, a charge controller could interrupt a charge in progress, observe the change in voltage from a value under charge to an open circuit voltage value. This difference represents the voltage due to the charge current into the internal series resistance of the supercapacitor, and may be used to compensate the charging process independent of the rate of charge. Also note that the charge power delivery means may be integrated into the charge termination controller, or may be remotely tethered, as desired.

In one or more embodiments, the systems and methods described and claimed herein may be applied to and cover controlling charging of multiple series and/or parallel-connected supercapacitors as well.

Those skilled in the art will understand from the description provided herein that the charging and measurement control functions described can be implemented in a variety of manners, such as via a hardware state machine or microcontroller, along with analog measurement and power control. Alternatively, in one or more embodiments, a computer may be employed in implementing one or more aspects of the present invention described herein.

Figure 8:
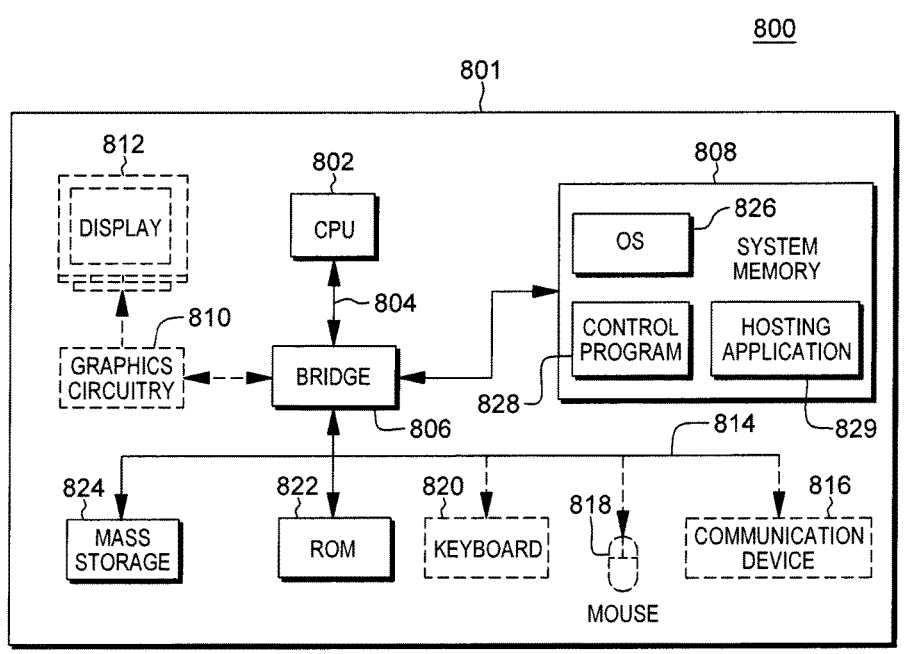
FIG. 8 depicts an exemplary data processing system for implementing one or more charge control aspects of the present invention.

FIG. 8 depicts a block diagram of one example of a computing environment to incorporate and use one or more aspects of the present invention. A set of components referred to herein as a computing environment 800 may include a data processing system 801. System 801 may include a processor (in this example a central processing unit (CPU)) 802 for performing computations. CPU 802 may be coupled to a bus bridge 806 by way of a CPU bus 804. Bus bridge 806 may include a memory controller (not shown) integrated therein, though the memory controller may be external to bus bridge 806. The memory controller may provide an interface for access by CPU 802 or other devices to system memory 808. System memory 808 can include any of a variety of types of memory device or memory circuitry for storing data. Bus bridge 806 may optionally be coupled to graphics circuitry 810 for controlling an optional display device 812. Graphics circuitry 810 may include, in one example, a video controller, video memory for storing display data to be displayed on display device 812, and a video BIOS that includes code and video services for controlling the video controller, as is well known in the art. In another embodiment, graphics circuitry 810 may be coupled to CPU 802 through an Advanced Graphics Port (AGP) bus.

Bus bridge 806 may also be coupled to a system bus 814 that may be a peripheral component interconnect (PCI) bus, Industry Standard Architecture (ISA) bus, etc., and combinations thereof, as examples. Coupled to system bus 814 may optionally be a communication device 816, mouse 818, keyboard 820, non-volatile memory 822, and mass storage 824. One or more other input/output (I/O) devices (not shown) may also be coupled to system bus 814.

Mass storage device 824, if provided, can be any of numerous different types of such devices including a hard disk, floppy disk, CD-ROM, DVD-ROM, tape, high density floppy, high capacity removable media, low capacity removable media, solid state memory device, etc., and combinations thereof. Non-volatile memory 822 may be a read-only memory (ROM), flash memory, etc., and can include a system BIOS for controlling, among other things, hardware devices in data processing system 801.

As is familiar to those having ordinary skill in the art, system 801 further includes an operating system 826, which is loaded into system memory 808 from mass storage device 824, for instance, and launched after a power-on self-test (POST). Operating system 826 includes a set of one or more programs that control computer system 801's operation and the allocation of resources thereof, among other things. Example operating systems include, but are not limited or restricted to, DOS, Unix, Linux, the Windows® line of operating systems offered by Microsoft Corporation, Redmond, Wash., and the "OS" line of operating systems (such as OS X®) offered by Apple Inc., Cupertino, Calif., etc. Also loaded into memory 808 of the computer system 801 is an control program 828 hosted by a hosting application 829. Control program 828 may be, in one or more embodiments, program code, which implements one or more aspects of the processing described herein.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In one example, a computer program product may include, for instance, one or more computer readable media to store computer readable program code means or logic thereon to provide and facilitate one or more aspects of the present invention.

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of one or more aspects of the invention and the practical application, and to enable others of ordinary skill in the art to understand one or more aspects of the invention for various embodiments with various modifications as are suited to the particular use contemplated.

What is claimed is:

1. A method comprising:
    initially measuring supercapacitor terminal voltage (V1);
    initiating charging a supercapacitor by applying a constant charge to the supercapacitor; and
    controlling termination of the constant charging of the supercapacitor, the controlling comprising:
        dynamically determining, based on the initiating charging, an overcharge voltage value at which to terminate supercapacitor charging by the constant charge to substantially fully charge the supercapacitor, the dynamically determined overcharge voltage value being greater than a rated supercapacitor full voltage value (Vfull) of the supercapacitor, and relating, at least in part, to internal resistance of the supercapacitor during the charging by the constant charge, the dynamically determining comprising:
            measuring supercapacitor terminal voltage (V2) during the constant charging of the supercapacitor;
            determining the internal resistance of the supercapacitor during the charging by the constant charge using the supercapacitor terminal voltage (V1) and the supercapacitor terminal voltage (V2), and a determined charging current; and
            using the determined internal resistance of the supercapacitor during the charging by the constant charge to determine the overcharge voltage value; and
        continuing with applying the constant charge to the supercapacitor until the dynamically determined overcharge voltage value is reached at the supercapacitor, and based on reaching the dynamically determined overcharge voltage value at the supercapacitor, terminating the charging of the supercapacitor.

2. The method of claim 1, wherein the initially measuring comprises measuring, during absence of charging, the supercapacitor terminal voltage (V1), and proceeding with the charging and the controlling termination based on the supercapacitor terminal voltage being less than the rated supercapacitor full voltage value (Vfull) for the supercapacitor.

3. The method of claim 1, wherein the initially measuring comprises measuring, prior to the charging, the supercapacitor terminal voltage (V1), wherein the dynamically determining uses the measured supercapacitor terminal voltage (V1) prior to the charging in dynamically determining, during the charging, the overcharge voltage value to be reached at the supercapacitor before terminating the charging of the supercapacitor.

4. The method of claim 1, wherein the charging comprises applying a constant power charge to the supercapacitor, the constant power charge being the constant charge.

5. The method of claim 1, wherein the charging comprises applying a constant current charge to the supercapacitor, the constant current charge being the constant charge.

6. A system for charging a supercapacitor, the system comprising:
    a power source to supply a constant charge to the supercapacitor; and
    a controller to initiate and control charging of the supercapacitor using the constant charge, the controller:
        initially measuring supercapacitor terminal voltage (V1);
        dynamically determining, based on the initiating charging, an overcharge voltage value at which to terminate supercapacitor charging by the constant charge to substantially fully charge the supercapacitor, the dynamically determined overcharge voltage value being greater than a rated supercapacitor full voltage value (Vfull) of the supercapacitor, and relating, at least in part, to internal resistance of the supercapacitor during the charging by the constant charge, the dynamically determining comprising:

measuring supercapacitor terminal voltage (V2) during the constant charging of the supercapacitor;

determining the internal resistance of the supercapacitor during the charging by the constant charge using the supercapacitor terminal voltage (V1) and the supercapacitor terminal voltage (V2), and a determined charging current; and using the determined internal resistance of the supercapacitor during the charging by the constant charge to determine the overcharge voltage value; and continuing with applying the constant charging to the supercapacitor until the dynamically determined overcharge voltage value is reached at the supercapacitor, and based on reaching the dynamically determined overcharge voltage value at the supercapacitor, terminating the charging of the supercapacitor.

7. The system of claim 6, wherein the controller initially measures, prior to the charging, the supercapacitor terminal voltage (V1), and where the dynamically determining uses the measured supercapacitor terminal voltage (V1) prior to the charging in dynamically determining, during the charging, the overcharge voltage value to be reached at the supercapacitor before terminating the charging of the supercapacitor.

8. The system of claim 6, wherein the constant charge supplied by the power source is a constant power charge.

9. The system of claim 6, wherein the constant charge supplied by the power source is a constant current charge.

* * * * *